US012347587B2

(12) United States Patent
Yamao et al.

(10) Patent No.: US 12,347,587 B2
(45) Date of Patent: Jul. 1, 2025

(54) GROMMET ASSEMBLY AND WIRE HARNESS

(71) Applicant: YAZAKI CORPORATION, Tokyo (JP)

(72) Inventors: Yoshimichi Yamao, Toyota (JP); Satoshi Yokoyama, Toyota (JP); Akihisa Unoh, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 231 days.

(21) Appl. No.: 18/320,960

(22) Filed: May 19, 2023

(65) Prior Publication Data

US 2023/0411049 A1 Dec. 21, 2023

(30) Foreign Application Priority Data

Jun. 15, 2022 (JP) ................................ 2022-096269

(51) Int. Cl.
*H01B 17/58* (2006.01)
*B60R 16/02* (2006.01)

(52) U.S. Cl.
CPC ....... *H01B 17/583* (2013.01); *B60R 16/0222* (2013.01)

(58) Field of Classification Search
None
See application file for complete search history.

(56) References Cited

U.S. PATENT DOCUMENTS

| | | | | |
|---|---|---|---|---|
| 3,633,250 | A * | 1/1972 | Romney | A47F 7/163 403/233 |
| 3,910,608 | A * | 10/1975 | Phillips, Jr. | F16L 41/086 285/19 |
| 5,487,680 | A * | 1/1996 | Yamanashi | H01R 13/743 439/567 |
| 5,562,292 | A * | 10/1996 | Roy | B60R 16/0222 277/634 |
| 5,660,564 | A * | 8/1997 | Yamanashi | H01R 13/741 439/563 |
| 5,927,725 | A * | 7/1999 | Tabata | H01R 13/5205 174/152 G |
| 6,211,464 | B1 * | 4/2001 | Mochizuki | F16L 5/02 174/659 |
| 6,218,625 | B1 * | 4/2001 | Pulaski | B60R 16/0222 174/153 G |

(Continued)

FOREIGN PATENT DOCUMENTS

| | | | |
|---|---|---|---|
| DE | 10053115 C1 * | 4/2002 | ......... B60R 16/0222 |
| EP | 0580130 A1 * | 1/1994 | |

(Continued)

*Primary Examiner* — Timothy J. Dole
*Assistant Examiner* — Muhammed Azam
(74) *Attorney, Agent, or Firm* — KENEALY VAIDYA LLP

(57) ABSTRACT

A grommet assembly includes: a grommet through which a wiring material is inserted, that is attached to a through hole formed on a panel for a vehicle; a resin inner arranged to abut on a side of the grommet opposite to the panel for the vehicle; and a protector through which the wiring material is inserted, the protector being locked to the resin inner and attached to the panel for the vehicle to hold the grommet and the resin inner between the protector and the panel for the vehicle.

9 Claims, 5 Drawing Sheets

(56) References Cited

U.S. PATENT DOCUMENTS

| | | | | |
|---|---|---|---|---|
| 6,372,995 B1* | 4/2002 | Mochizuki | | B60R 16/0222 174/152 G |
| 6,593,529 B2* | 7/2003 | Nakata | | H02G 3/22 174/152 G |
| 6,600,104 B2* | 7/2003 | Nakata | | B60R 16/0222 174/152 G |
| 6,685,195 B2* | 2/2004 | Uchida | | H02G 15/013 174/665 |
| 6,708,366 B2* | 3/2004 | Ono | | B60R 16/0222 16/2.5 |
| 6,779,243 B2* | 8/2004 | Nakata | | B60R 16/0222 29/451 |
| 6,897,380 B2* | 5/2005 | Sakata | | B60R 16/0222 174/64 |
| 6,995,316 B1* | 2/2006 | Goto | | H02G 15/013 174/152 G |
| 7,098,401 B1* | 8/2006 | Herald | | H02G 3/22 174/152 G |
| 7,915,534 B2* | 3/2011 | Uchibori | | B60R 16/0222 174/152 G |
| 8,375,513 B2* | 2/2013 | Okuhara | | H02G 3/22 174/152 G |
| 8,563,878 B2* | 10/2013 | Suzuki | | B60R 16/0222 174/650 |
| 8,651,460 B2* | 2/2014 | Callahan | | H02G 1/085 439/538 |
| 8,704,099 B2* | 4/2014 | Agusa | | B60R 16/0222 174/152 G |
| 8,925,147 B2* | 1/2015 | Furuta | | B60R 16/0222 174/152 G |
| 9,070,496 B2* | 6/2015 | Arakawa | | H01B 17/14 |
| 9,083,168 B2* | 7/2015 | Kamenoue | | B60R 16/0222 |
| 9,096,185 B2* | 8/2015 | Fujita | | B60R 16/0222 |
| 9,263,865 B2* | 2/2016 | Adachi | | H02G 3/0406 |
| 9,315,163 B2* | 4/2016 | Nagayasu | | H02G 3/0691 |
| 9,365,170 B2* | 6/2016 | Gronowicz, Jr. | | B60R 16/0222 |
| 9,425,597 B2* | 8/2016 | Suzuki | | B60R 16/0222 |
| 9,806,454 B2* | 10/2017 | Nakai | | H01R 13/5205 |
| 9,825,397 B2* | 11/2017 | Watai | | B60R 16/0222 |
| 10,183,636 B2* | 1/2019 | Kaefer | | H02G 3/22 |
| 10,214,162 B2* | 2/2019 | Kamenoue | | H02G 3/22 |
| 10,373,737 B2* | 8/2019 | Takahashi | | H02G 3/0691 |
| 10,574,046 B2* | 2/2020 | Okuhara | | F16B 21/183 |
| 10,626,943 B2* | 4/2020 | Namiki | | F16F 1/3732 |
| 10,994,674 B2* | 5/2021 | Yokoyama | | H02G 3/0462 |
| 11,014,512 B2* | 5/2021 | Ledwith | | B60J 5/10 |
| 11,018,462 B2* | 5/2021 | Akagi | | H01R 13/5202 |
| 11,052,840 B2* | 7/2021 | Cho | | B60R 16/0222 |
| 11,097,673 B2* | 8/2021 | Yokoyama | | B60R 16/0222 |
| 11,127,516 B2* | 9/2021 | Kiuchi | | H02G 3/0462 |
| 11,186,239 B2* | 11/2021 | Kiuchi | | H01B 17/58 |
| 11,279,302 B2* | 3/2022 | Toyoda | | H02G 3/22 |
| 11,404,185 B2* | 8/2022 | Yamaguchi | | H01B 17/583 |
| 11,600,941 B2* | 3/2023 | Kimura | | H01R 13/74 |
| 11,621,106 B2* | 4/2023 | Aoshima | | H01R 13/5202 174/650 |
| 11,651,876 B2* | 5/2023 | Kiyota | | H01B 17/586 174/72 A |
| 12,214,737 B2* | 2/2025 | Yamao | | B60R 16/0222 |
| 12,237,099 B2* | 2/2025 | Kobayashi | | F16L 5/02 |
| 2004/0154819 A1* | 8/2004 | Sakata | | B60R 16/0222 174/650 |
| 2009/0028659 A1* | 1/2009 | Shibuya | | F16B 21/073 411/57.1 |
| 2009/0065235 A1* | 3/2009 | Uchibori | | B60R 16/0222 174/152 G |
| 2010/0307817 A1* | 12/2010 | Roy | | H02G 3/185 174/666 |
| 2011/0247172 A1* | 10/2011 | Yoshii | | B60R 13/0206 16/2.1 |
| 2012/0149243 A1* | 6/2012 | Ohnishi | | H01R 43/24 29/883 |
| 2012/0217041 A1* | 8/2012 | Agusa | | H02G 3/22 174/153 G |
| 2012/0252272 A1* | 10/2012 | Omae | | H01R 13/506 439/607.01 |
| 2013/0061424 A1* | 3/2013 | Lee | | E02F 9/163 16/2.2 |
| 2013/0068502 A1* | 3/2013 | Law | | B60R 16/0222 174/152 G |
| 2013/0313787 A1* | 11/2013 | Fujiki | | F16L 5/10 277/606 |
| 2015/0140851 A1* | 5/2015 | Wang | | H01R 13/6597 439/275 |
| 2015/0144378 A1* | 5/2015 | Asayama | | H02G 3/22 174/152 G |
| 2016/0039368 A1* | 2/2016 | Shitamichi | | F16L 5/02 16/2.2 |
| 2016/0225496 A1* | 8/2016 | Fujita | | H02G 3/0437 |
| 2017/0148551 A1* | 5/2017 | Gakuhari | | H02G 3/085 |
| 2018/0304833 A1* | 10/2018 | Urashima | | B60R 16/0222 |
| 2020/0335900 A1* | 10/2020 | Ishikawa | | H01R 13/5205 |
| 2021/0239239 A1* | 8/2021 | Haynes | | F16L 5/14 |
| 2021/0309170 A1* | 10/2021 | Liebelt | | F16B 21/075 |
| 2022/0013257 A1* | 1/2022 | Liebelt | | H01B 17/583 |
| 2023/0042371 A1* | 2/2023 | Grall | | H02G 3/22 |
| 2023/0411048 A1* | 12/2023 | Yamao | | H01B 17/583 |
| 2023/0411049 A1* | 12/2023 | Yamao | | H01B 17/583 |
| 2024/0127986 A1* | 4/2024 | Kiyota | | H01B 17/583 |
| 2024/0136091 A1* | 4/2024 | Kiyota | | H01B 17/583 |

FOREIGN PATENT DOCUMENTS

| | | | | |
|---|---|---|---|---|
| EP | 0731000 A2 | * | 9/1996 | |
| FR | 3029706 A1 | * | 6/2016 | B60R 16/0222 |
| JP | H03-18622 U | | 2/1991 | |
| JP | 2004-159461 A | | 6/2004 | |
| JP | 2017158276 A | * | 9/2017 | B60R 16/0222 |
| KR | 101315731 B1 | * | 10/2013 | |
| KR | 101592121 B1 | * | 2/2016 | |
| WO | WO-2010053067 A1 | * | 5/2010 | B60R 16/0222 |
| WO | WO-2011122091 A1 | * | 10/2011 | B60R 16/0222 |
| WO | WO-2015012153 A1 | * | 1/2015 | B60R 16/0222 |

* cited by examiner

GROMMET ASSEMBLY AND WIRE HARNESS

CROSS-REFERENCE TO RELATED APPLICATION(S)

The present application claims priority to and incorporates by reference the entire contents of Japanese Patent Application No. 2022-096269 filed in Japan on Jun. 15, 2022.

BACKGROUND OF THE INVENTION

1. Field of the Invention

The present invention relates to a grommet assembly and a wire harness.

2. Description of the Related Art

In the related art, there are known a grommet assembly and a wire harness obtained by mounting a grommet in a through hole through which the wire harness is inserted, and integrating the grommet with a metal plate by insert molding as disclosed in Japanese Patent Application Laid-open No. 2004-159461, for example. That is, in these grommet assembly and wire harness, the grommet is mounted in the through hole formed on a vehicle body panel, the metal plate is fastened and fixed to the vehicle body panel together with a protector, and the grommet is pressure-welded and attached to the vehicle body panel by the metal plate.

With the grommet assembly and the wire harness described above, it is difficult to suppress component cost to be low. That is, in the grommet assembly and the wire harness, the metal plate is used for pressure-welding the grommet to the vehicle body panel, and the component cost of the metal plate is high. Additionally, there is room for further improvement in a configuration for appropriate attachment to an attachment target such that higher component cost is required to integrate the grommet with the metal plate by insert molding, for example.

SUMMARY OF THE INVENTION

Thus, the present invention aims at providing a grommet assembly and a wire harness that can be appropriately attached to an attachment target.

In order to achieve the above mentioned object, a grommet assembly according to one aspect of the present invention includes a grommet through which a wiring material is inserted, that is attached to a through hole formed on a panel for a vehicle; a resin inner arranged to abut on a side of the grommet opposite to the panel for the vehicle; and a protector through which the wiring material is inserted, the protector being locked to the resin inner and attached to the panel for the vehicle to hold the grommet and the resin inner between the protector and the panel for the vehicle.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment according to the present invention in detail based on the drawings. The present invention is not limited to this embodiment.

Constituent elements in the following embodiment encompass a constituent element that can be easily replaced by those skilled in the art, or substantially the same constituent element.

Embodiment

Figure 1:
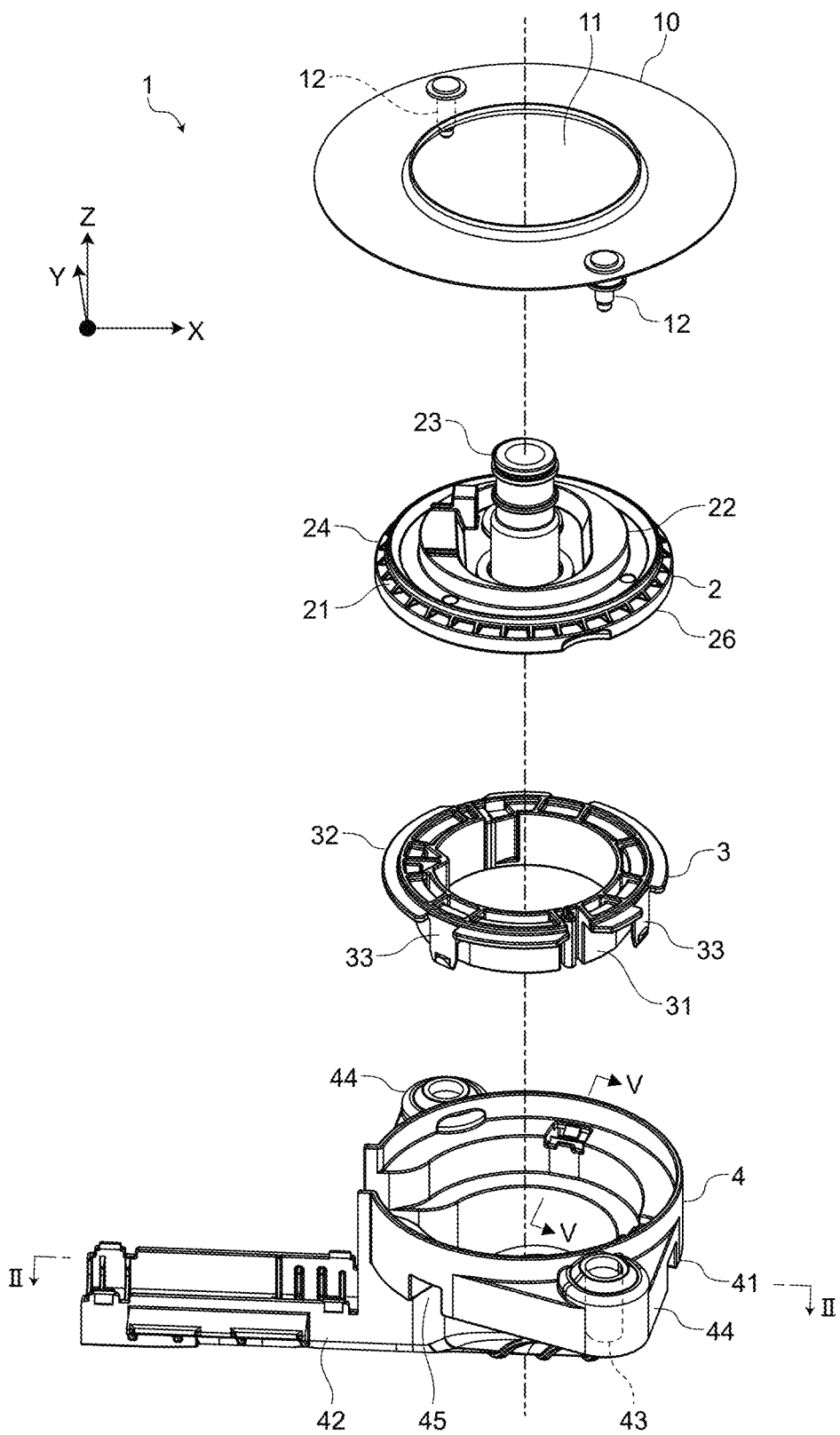
FIG. 1 is an exploded perspective view of a grommet assembly according to an embodiment.
Figure 2:
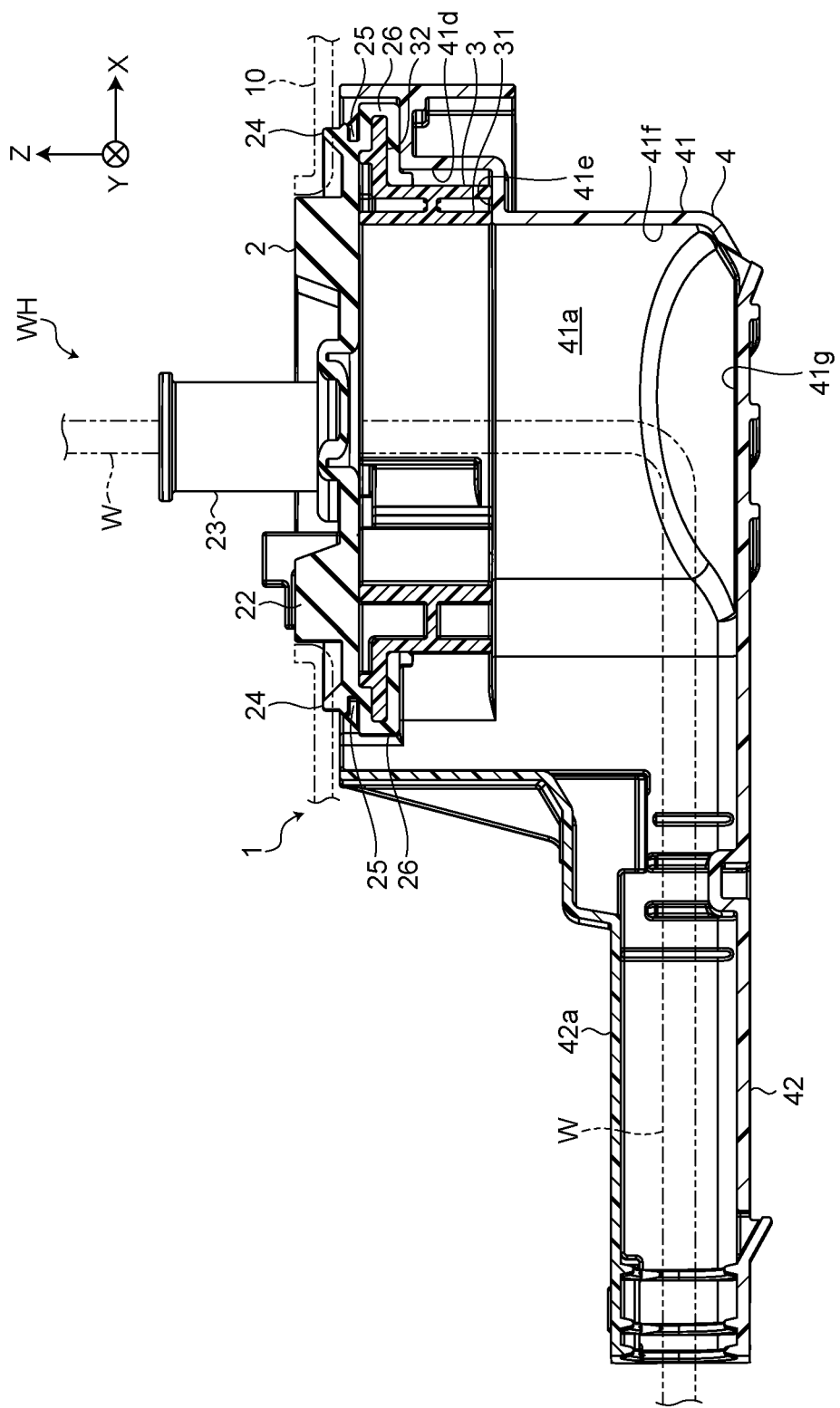
FIG. 2 is a cross-sectional view of the grommet assembly along II-II in FIG. 1 and a wire harness.
Figure 3:
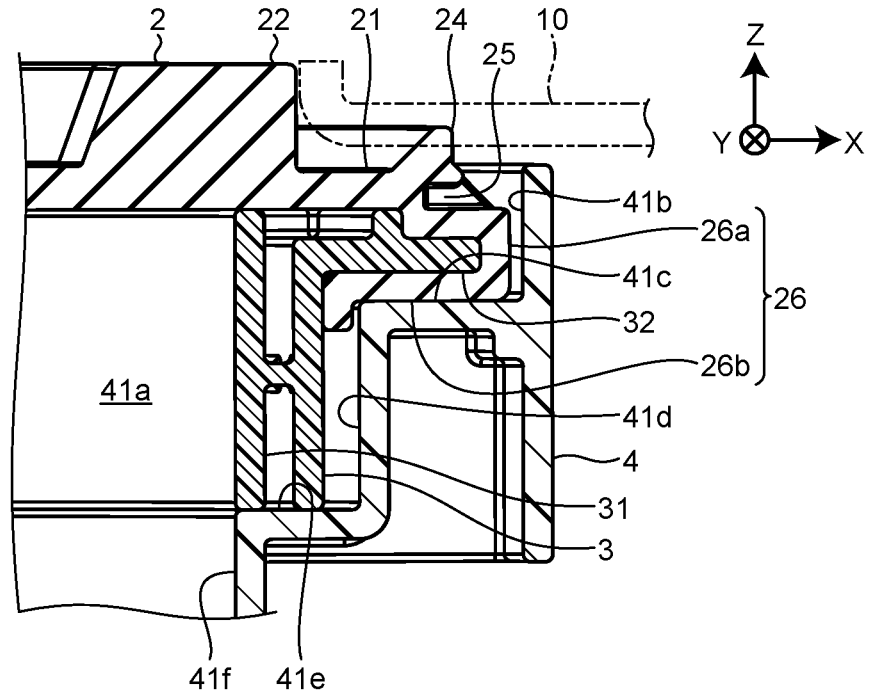
FIG. 3 is an enlarged cross-sectional view of the grommet assembly along II-II in FIG. 1.
Figure 4:
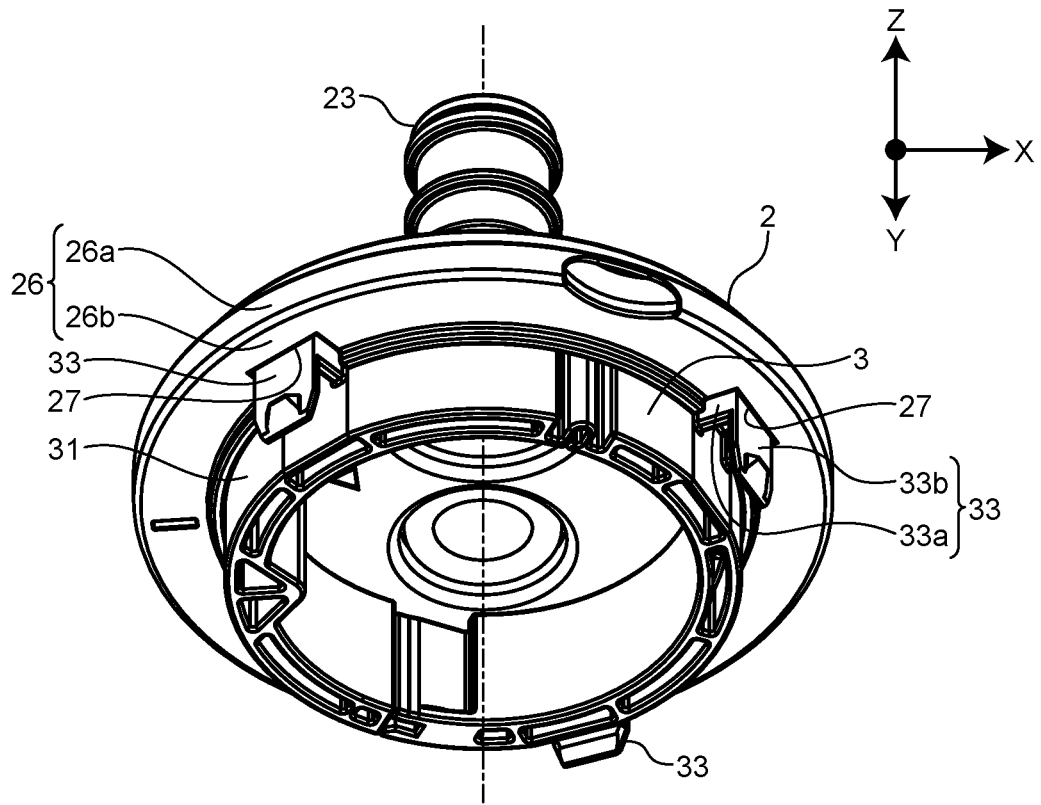
FIG. 4 is a perspective view of a grommet and a resin inner in the grommet assembly.
Figure 5:
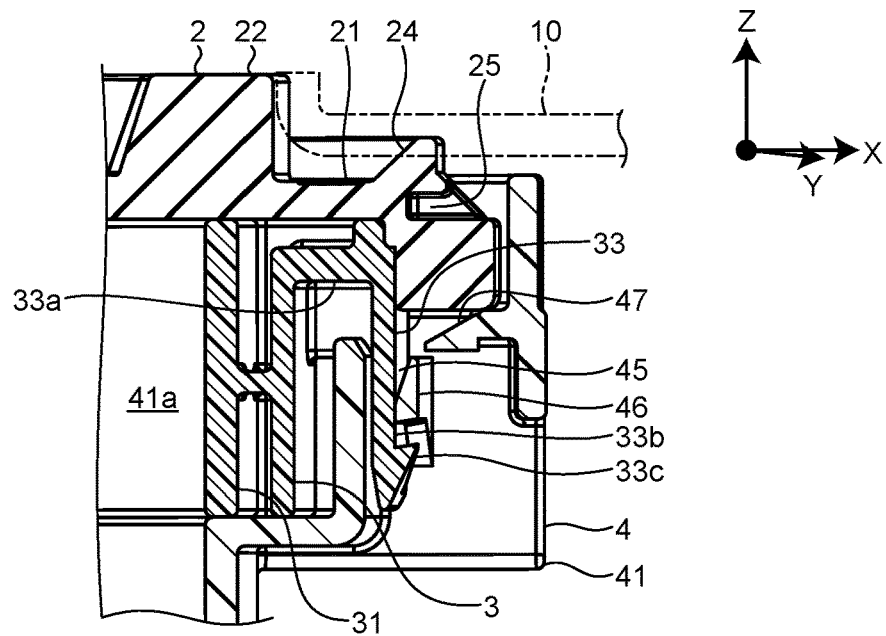
FIG. 5 is an enlarged cross-sectional view of the grommet assembly along V-V in FIG. 1.
Figure 6:
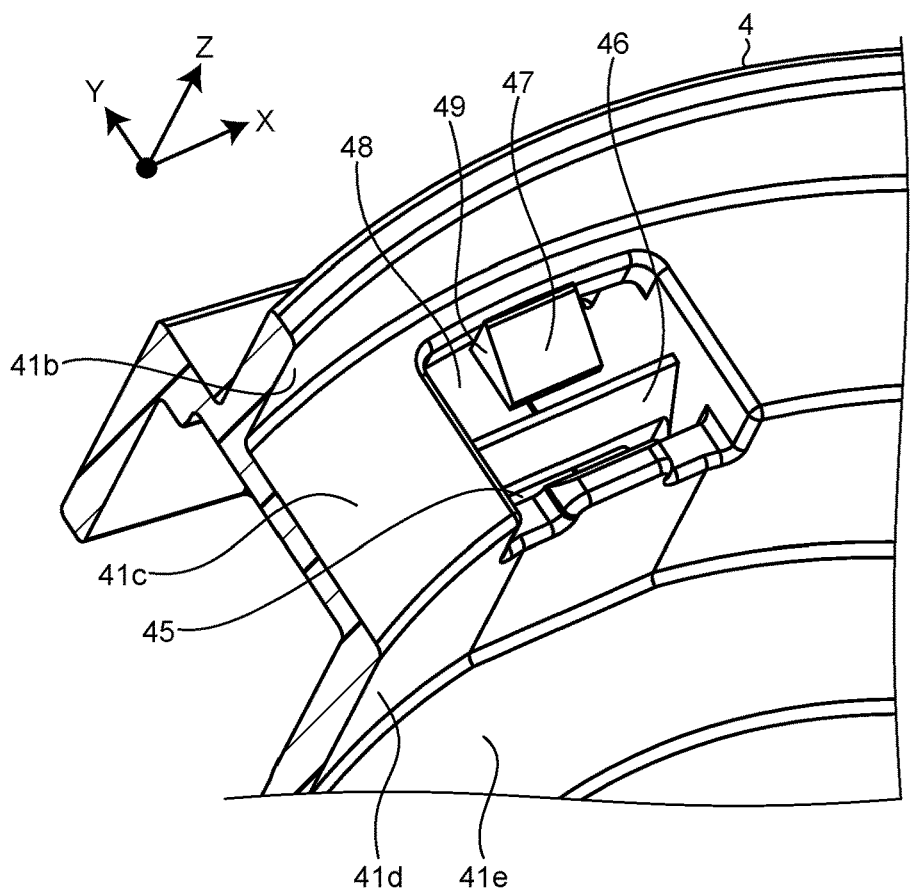
FIG. 6 is a perspective view illustrating a protector.
Figure 7:
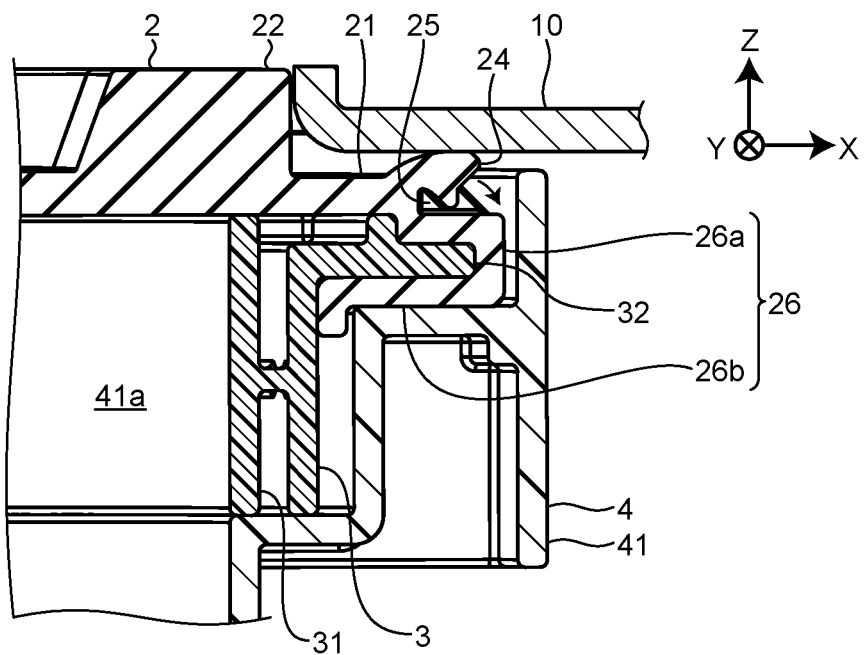
FIG. 7 is an enlarged cross-sectional view illustrating a pressure-welded state of a lip part.

FIG. 1 is an exploded perspective view of a grommet assembly according to an embodiment, and FIG. 2 is a vertical cross-sectional view of the grommet assembly and a wire harness. FIG. 3 is an enlarged cross-sectional view of a grommet, and FIG. 4 is a perspective view of the grommet and a resin inner. FIG. 5 is an enlarged cross-sectional view of the resin inner and a protector, FIG. 6 is a perspective view of the protector, and FIG. 7 is an enlarged cross-sectional view illustrating a pressure-welded state of a lip part.

As illustrated in FIGS. 1 and 2, a grommet assembly 1 has an X-direction, a Y-direction and a Z-direction, and is an assembly for attaching a grommet 2 to a panel 10, and includes the grommet 2, a resin inner 3, and a protector 4. A wire harness WH includes the grommet assembly 1 and a wiring material W. For example, the wire harness WH is configured by incorporating the grommet assembly 1 with the wiring material W routed in a vehicle. Herein, the wire harness WH is obtained by bundling a plurality of the wiring materials W to be a collective component, for example, and electrically connects between devices mounted on the vehicle. The wire harness WH may also include another component such as a corrugated tube and resin tape. The wiring material W has electrical conductivity, connects between devices mounted on the vehicle, and is used for power supply and signal communication. The wiring material W is, for example, constituted of a metal rod, an electric wire, an electric wire bundle, and the like. The metal rod is obtained by covering an outer side of a rod-like member having electrical conductivity with a covering part having an insulation property. The electric wire is obtained by covering an outer side of a conductor part (core wire) constituted of a plurality of metal wires having electrical conductivity with a covering part having an insulation property. The electric wire bundle is obtained by bundling the electric wires.

The panel 10 is a panel for the vehicle, and is a floor panel disposed on a floor portion of a vehicle body, for example. The panel 10 is an attachment target to which the grommet 2 is attached, and constituted of a plate-like member disposed in a horizontal direction. For convenience of explanation, part of the panel 10 is illustrated in a circular shape in FIG. 1. An overall shape of the panel 10 is a shape corresponding to a structure of the vehicle, for example.

A through hole 11 is formed on the panel 10. The through hole 11 is a hole through which the wire harness WH is inserted, and passes through front and back faces of the panel 10 to cause a vehicle exterior side of the panel 10 to communicate with a vehicle interior side thereof. In FIG. 1, a lower side of the panel 10 is the vehicle exterior side, and an upper side thereof is the vehicle interior side. FIG. 1 illustrates a case in which the through hole 11 is opened in a circular shape, but there is a case in which the through hole 11 is opened in a shape other than the circular shape. Bolts 12 are disposed on a lower surface of the panel 10. The bolts 12 are projected from the lower surface of the panel 10 toward a lower side. For example, the two bolts 12 are disposed at positions across the through hole 11, for example. The bolt 12 functions as a fastening member for attaching the protector 4 to the panel 10.

The grommet 2 is a member that is attached to the through hole 11, and covers and protects the wiring material W inserted therethrough. The grommet 2 is, for example, constituted of an elastic body that can be elastically deformed, and constituted of rubber, an elastic resin material, or the like. The grommet 2 fills up a gap between the wiring material W and an inner edge of the through hole 11 to protect the wiring material W, and cuts off water inside and outside the vehicle. The grommet 2 may also function as a member that achieves dustproofing and soundproofing for the vehicle.

The grommet 2 includes a main body part 21, an insertion part 22, and a cylindrical part 23. The main body part 21 is a part arranged on the vehicle exterior side of the panel 10, and is formed to be larger than the through hole 11 to have a disc shape, for example. The insertion part 22 is a part to be inserted through the through hole 11, and is formed to have a size that can be inserted through the through hole 11 and have a round pillar shape or a cylindrical shape, for example. The cylindrical part 23 is a part that covers the wiring material W inserted therethrough, and is projected from the main body part 21 or the insertion part 22 along a passing-through direction of the through hole 11. FIG. 1 illustrates a case in which two cylindrical parts 23 are formed. One or three or more cylindrical parts 23 may be formed in accordance with the number of wiring materials W to be inserted.

A lip part 24, a hollow part 25, and a supporting part 26 are formed on the grommet 2. The lip part 24 is a part abutting on the panel 10, and is projected from the main body part 21 toward the panel 10. The lip part 24 is formed as continuous projections surrounding a periphery of the insertion part 22, for example. When the lip part 24 is pressure-welded to the panel 10, the vehicle interior side and the vehicle exterior side of the through hole 11 are sealed off by the grommet 2, and a water cutoff function of the grommet 2 is exhibited.

As illustrated in FIG. 3, the hollow part 25 is a hollow space portion in the grommet 2, and formed in a region on the resin inner 3 side with respect to the lip part 24. That is, the hollow part 25 is formed in a region on the opposite side of the panel 10 with respect to the lip part 24, and allows the lip part 24 pressure-welded to the panel 10 to be easily bent. For example, the hollow part 25 is formed as a groove extending in a circumferential direction by recessing an outer peripheral portion of the main body part 21 in a radial direction. The lip part 24 is pressed against the panel 10 when the grommet 2 is attached to the panel 10. However, by forming the hollow part 25, the lip part 24 can be bent to move toward the hollow part 25 side before being deformed to be crushed.

The supporting part 26 is a part that supports the resin inner 3, and is formed on the resin inner 3 side of the main body part 21. The supporting part 26 is engaged with the resin inner 3, and enables the grommet 2 to be mounted on the resin inner 3. For example, the supporting part 26 supports a flange part 32 of the resin inner 3 by covering it, and integrates the grommet 2 with the resin inner 3. Specifically, the supporting part 26 has a structure including an outer cylindrical part 26a that covers an outer peripheral portion of the flange part 32, and an annular part 26b that covers a lower surface portion of the flange part 32. The outer cylindrical part 26a is formed in a cylindrical shape, and the annular part 26b is continuous to a lower end of the outer cylindrical part 26a and extends inward in a radial direction.

In FIG. 1, the resin inner 3 is a member that is attached to the grommet 2, is constituted of a resin member, and has higher rigidity than that of the grommet 2. The resin inner 3 is arranged to abut on a side of the grommet 2 opposite to the panel 10. Due to this, in a case in which the protector 4 is attached to the panel 10, pressing force from the protector 4 can be received by the resin inner 3 to be transmitted to the grommet 2. The resin inner 3 may be arranged so that at least part thereof abuts on the side of the grommet 2 opposite to the panel 10, and the other part is not necessarily arranged on the side of the grommet 2 opposite to the panel 10.

The resin inner 3 includes a main body part 31, the flange part 32, and locking parts 33. The main body part 31 is formed in a cylindrical shape, and is arranged so that an axial direction agrees with the passing-through direction of the through hole 11. The axial direction is a direction along a center axis of the main body part 31, which is the Z-direction illustrated in the drawing. The wiring material W can be inserted through the main body part 31. The flange part 32 is formed to extend outward in the radial direction from the main body part 31. For example, as illustrated in FIG. 3, the flange part 32 extends outward in the radial direction from a position on the panel 10 side of the main body part 31, and extends to the position of the lip part 24 of the grommet 2. Due to this, when the protector 4 is attached to the panel 10, the lip part 24 can be pressed by the flange part 32 of the resin inner 3 having high rigidity, and the grommet 2 can be securely pressed against the panel 10.

In FIG. 1, the main body part 31 and the flange part 32 are disposed in an annular shape, but they may have a structure combining two semi-annular members, for example. In this case, the main body part 31 and the flange part 32 can be divided into two semi-annular members, or can be opened and closed. That is, insertion of the wiring material W is facilitated such that the wiring material W is inserted in a state in which they are opened or divided into two semi-annular members, and they are combined to be the main body part 31 and the flange part 32 having an annular shape thereafter.

As illustrated in FIG. 4, the locking part 33 is a part that is disposed on an outer circumference of the main body part 31 for locking the protector 4. For example, a plurality of the locking parts 33 are disposed. In FIG. 4, three locking parts 33 are disposed at intervals along a circumferential direction of the resin inner 3. Two or four or more locking parts 33 may be disposed. The locking part 33 includes an arm 33a and a locking pawl 33b. The arm 33a projects outward in the radial direction from an outer peripheral surface of the main body part 31. The locking pawl 33b is formed to extend in the axial direction from a distal end of the arm 33a. That is, the locking pawl 33b is bent from the arm 33a to extend toward the protector 4 side in the axial direction, and can be locked onto the protector 4. At a distal end portion of the locking pawl 33b, a hook part 33c projecting in the radial direction is formed.

The resin inner 3 is disposed while the locking part 33 is inserted into a recessed part 27 of the grommet 2. Due to this, relative rotational movement of the resin inner 3 and the grommet 2 is suppressed. The recessed part 27 is an indentation formed on the supporting part 26 of the grommet 2. For example, the recessed part 27 is formed on the annular part 26b of the supporting part 26, the recessed part 27 being recessed outward in the radial direction into which the locking part 33 can be inserted. A plurality of the recessed parts 27 are disposed in accordance with forming positions and the number of formed locking parts 33 in the circumferential direction. That is, the locking part 33 and the recessed part 27 are disposed so that the locking part 33 is inserted into the recessed part 27 in a case in which the resin inner 3 is mounted on the grommet 2.

As illustrated in FIGS. 1 and 2, the protector 4 is a member that protects the grommet 2, the resin inner 3, and the wiring material W, and regulates a routing path of the wiring material W. The protector 4 is attached to the panel 10 so as to house the grommet 2, the resin inner 3, and the wiring material W, and holds the grommet 2 and the resin inner 3 between the protector 4 and the panel 10.

The protector 4 includes a base member 40 that covers the grommet 2, the resin inner 3, and the wiring material W. The base member 40 includes a first base part 41 and a second base part 42. The first base part 41 is a part that is arranged at a forming position of the through hole 11 to cover and protect the grommet 2 and the resin inner 3. The first base part 41 is formed in a cylindrical shape in which an end face on the panel 10 side is opened. In a case in which the protector 4 is attached to the panel 10, the first base part 41 covers the grommet 2 and the resin inner 3, and protects the grommet 2 and the resin inner 3.

The second base part 42 is formed to be continuous to the first base part 41, and is disposed to project in the radial direction from a side part of the first base part 41. The wiring material W extending from the first base part 41 is inserted through the second base part 42. That is, the wiring material W is inserted through the first base part 41 while being bent from the axial direction to the radial direction, and extends from the first base part 41 to be inserted through the second base part 42. In a case in which the protector 4 is attached to the panel 10, the second base part 42 protects the wiring material W inserted therethrough. FIG. 1 illustrates the protector 4 in a state in which a cover 42a that covers a side surface portion of the first base part 41 and the panel 10 side of the second base part 42 is removed.

In FIGS. 2 and 3, an internal space 41a of the first base part 41 has a round pillar shape, for example, and is a stepped space the inner diameter of which is reduced as being separated from the panel 10. That is, the internal space 41a is defined by a first inner peripheral surface 41b, a first parallel surface 41c, a second inner peripheral surface 41d, a second parallel surface 41e, a third inner peripheral surface 41f, and a bottom surface 41g. That is, in the internal space 41a, inner peripheral surfaces are formed in order of the first inner peripheral surface 41b, the second inner peripheral surface 41d, and the third inner peripheral surface 41f from the panel 10 side. An inner diameter of the second inner peripheral surface 41d is smaller than an inner diameter of the first inner peripheral surface 41b, and an inner diameter of the third inner peripheral surface 41f is smaller than an inner diameter of the second inner peripheral surface 41d. The first parallel surface 41c formed to be parallel with the panel 10 is formed between the first inner peripheral surface 41b and the second inner peripheral surface 41d, and the second parallel surface 41e formed to be parallel with the panel 10 is formed between the second inner peripheral surface 41d and the third inner peripheral surface 41f. Due to this, the internal space 41a has a shape having two steps.

In the internal space 41a, the grommet 2 and the flange part 32 of the resin inner 3 are arranged on an inner side of the first inner peripheral surface 41b. The supporting part 26 of the grommet 2 covering the flange part 32 abuts on the first parallel surface 41c. The main body part 31 of the resin inner 3 abuts on the second parallel surface 41e. Due to this, when the protector 4 is attached to the panel 10, the grommet 2 can be pressure-welded to the panel 10 via the resin inner 3.

In FIG. 1, an insertion hole 43 through which the bolt 12 is inserted is bored on the protector 4. The insertion hole 43 is a hole that is formed in the axial direction, and is formed at a projecting part 44 projected in the radial direction from the outer peripheral surface of the first base part 41, for example. The insertion hole 43 and the projecting part 44 are formed corresponding to arrangement positions of the bolts 12. In FIG. 1, two insertion holes 43 and two projecting parts 44 are formed corresponding to the two bolts 12.

As illustrated in FIGS. 5 and 6, a hole part 45, a part to be locked 46, and an inclined surface 47 are formed on the protector 4. The hole part 45 is a hole for inserting the locking pawl 33b therein, and is formed to have a size with which the locking pawl 33b can be inserted by opening the first parallel surface 41c, for example. Hole parts 45 are formed in accordance with forming positions and number of arranged locking pawls 33b. The part to be locked 46 is a portion for locking the locking pawl 33b, and is configured so that the hook part 33c at the distal end of the locking pawl 33b can be hooked thereon, for example. Specifically, the part to be locked 46 is a locking piece extending in a circumferential direction of the first base part 41 of the hole part 45, and defines a side wall of the hole part 45. The hook part 33c of the locking pawl 33b is hooked on an end part on the far side of the hole part 45. Due to this, the locking pawl 33b is locked to be prevented from coming off from the hole part 45.

The inclined surface 47 is a wall surface for guiding the locking pawl 33b to the hole part 45, and is formed in the vicinity of an entrance of the hole part 45 to be inclined with respect to the axial direction, for example. For example, the inclined surface 47 is formed on a projecting part 49 projecting inward from an inner edge on an outer side in the radial direction of an opening 48 formed on the first parallel surface 41c. The inclined surface 47 is inclined toward the entrance of the hole part 45, and guides the locking pawl 33b so that the locking pawl 33b is inserted into the hole part 45 at the time when the resin inner 3 is attached to the protector 4.

Next, the following describes an assembly method for the grommet assembly and the wire harness according to the present embodiment.

First, as illustrated in FIG. 1, the wiring material W is inserted through the grommet 2. For example, the wiring material W is inserted through the grommet 2 as an elastic body while a diameter of the grommet 2 is expanded. The resin inner 3 is then assembled to the wiring material W. For example, the main body part 31 and the flange part 32 of the resin inner 3 are divided or opened, and the wiring material W is arranged on an inner side of the resin inner 3. When the main body part 31 and the flange part 32 are assembled to each other or closed to have an annular shape, the resin inner 3 is assembled to the wiring material W. The wiring material W is then inserted through the protector 4. For example, the cover 42a of the protector 4 is opened, and the wiring material W is inserted through inner parts of the first base part 41 and the second base part 42 of the protector 4. The cover 42a is then closed, and the protector 4 is assembled to the wiring material W.

Thereafter, as illustrated in FIGS. 3 and 4, the grommet 2 is mounted on the resin inner 3. That is, the flange part 32 of the resin inner 3 is covered by the supporting part 26 of the grommet 2, and the grommet 2 is mounted on the resin inner 3. At this point, the resin inner 3 and the grommet 2 are joined so that the locking part 33 of the resin inner 3 is inserted into the recessed part 27 of the grommet 2. The supporting part 26 covers the flange part 32 from a side surface to a lower surface, so that the flange part 32 can be securely supported. When the locking part 33 is inserted into the recessed part 27, relative rotational movement of the grommet 2 and the resin inner 3 is suppressed.

Next, the grommet 2 and the resin inner 3 are attached to the protector 4. As illustrated in FIG. 2, the grommet 2 and the resin inner 3 are housed in the internal space 41a of the first base part 41. At this point, as illustrated in FIG. 5, the grommet 2 and the resin inner 3 are housed in the internal space 41a so that the locking pawl 33b of the resin inner 3 is inserted into the hole part 45 of the protector 4. Even in a case in which an insertion position of the locking pawl 33b is deviated, the locking pawl 33b is smoothly guided to the hole part 45 by the inclined surface 47. When the hook part 33c of the locking pawl 33b is hooked on the part to be locked 46, the resin inner 3 is locked to the protector 4, and the grommet 2, the resin inner 3, and the protector 4 are integrated with each other.

The protector 4 is then attached to the panel 10. As illustrated in FIG. 2, the first base part 41 of the protector 4 is aligned with the position of the through hole 11, and the lip part 24 of the grommet 2 abuts on the panel 10. As illustrated in FIG. 1, when the bolt 12 is inserted through the insertion hole 43 of the protector 4, the protector 4 is arranged at a correct position with respect to the panel 10. The grommet 2 and the resin inner 3 are arranged at correct positions with respect to the protector 4, so that arrangement positions of the grommet 2 and the resin inner 3 with respect to the panel 10 become correct positions. Due to this, the grommet 2 is attached while being appropriately arranged with respect to the through hole 11 without using a metal plate.

A nut (not illustrated) is screwed onto the bolt 12 to be fastened. Due to this, the protector 4 is brought close to the panel 10 to be fixed. At this point, as illustrated in FIG. 3, the protector 4 presses the grommet 2 via the resin inner 3, and the lip part 24 of the grommet 2 is pressure-welded to the panel 10. Due to this, for example, as compared with a case in which a portion as the resin inner 3 is an elastic body and configured as part of the grommet 2, excessive deformation of the grommet 2 can be suppressed, and a water cutoff function of the grommet 2 can be appropriately exhibited. That is, if the portion as the resin inner 3 is constituted of a member having the same rigidity as that of the grommet 2, the protector 4 presses the entire grommet 2. In this case, stress is applied to the entire grommet 2, and portions other than the lip part 24 are unnecessarily deformed. Due to this, there is the possibility that the grommet 2 cannot exhibit a desired water cutoff function. In contrast, the grommet 2 according to the present embodiment can suppress such a failure, and can exhibit an appropriate water cutoff function.

When the lip part 24 of the grommet 2 is pressure-welded to the panel 10, the lip part 24 is prevented from being excessively pressed against the panel 10, and the lip part 24 can be appropriately pressure-welded to the panel 10. That is, as illustrated in FIG. 7, the hollow part 25 is formed in a region on the resin inner 3 side with respect to the lip part 24, so that the lip part 24 is bent toward the hollow part 25 side when strong pressing force is about to be applied to the lip part 24. Due to this, the lip part 24 is prevented from being excessively pressed against the panel 10. Thus, even in a case in which there is a manufacturing error or the like in a constituent part of the grommet assembly 1, the grommet 2 can be attached by appropriately pressure-welding the lip part 24 to the panel 10, and the grommet assembly 1 can exhibit appropriate water cutoff performance due to the grommet 2.

When the protector 4 is attached to the panel 10, attachment of the grommet 2, the resin inner 3, and the wire harness WH is completed, and the wiring material W can be inserted through the through hole 11 of the panel 10 to be arranged.

As described above, with the grommet assembly 1 and the wire harness WH according to the present embodiment, the protector 4 is attached to the panel 10 while holding the grommet 2 and the resin inner 3 therebetween. Due to this, with the grommet assembly 1 and the wire harness WH, the grommet 2 can be attached to the panel 10 while being pressed against the panel 10. With the grommet assembly 1 and the wire harness WH, arrangement of a metal plate can be omitted by using the resin inner 3, so that component cost can be reduced. With the grommet assembly 1 and the wire harness WH, the grommet 2 can be appropriately attached to the panel 10 while the cost is reduced by omitting arrangement of a metal plate.

With the grommet assembly 1 and the wire harness WH according to the present embodiment, the resin inner 3 is arranged to abut on the side of the grommet 2 opposite to the panel 10. Due to this arrangement, with the grommet assembly 1 and the wire harness WH, the grommet 2 can be pressed toward the panel 10 side via the resin inner 3. Accordingly, the grommet 2 can be prevented from being excessively deformed.

With the grommet assembly 1 and the wire harness WH according to the present embodiment, the hollow part 25 is formed on the grommet 2, so that the lip part 24 can be bent toward the hollow part 25 side at the time when the grommet 2 is pressed toward the panel 10 side. Due to this, with the grommet assembly 1 and the wire harness WH, the lip part 24 can be prevented from being excessively pressed against the panel 10. Thus, the grommet assembly 1 and the wire harness WH can stabilize pressing force of the lip part 24 to the panel 10.

With the grommet assembly 1 and the wire harness WH according to the present embodiment, the flange part 32 of the resin inner 3 extends outward in the radial direction to the position of the lip part 24. Due to this, with the grommet assembly 1 and the wire harness WH, the lip part 24 of the grommet 2 can be pressed against the panel 10 by the flange part 32 of the resin inner 3. Thus, with the grommet assembly 1 and the wire harness WH, rigidity of the portion that presses the lip part 24 can be secured, and the grommet 2 can be securely pressed against the panel 10.

With the grommet assembly 1 and the wire harness WH according to the present embodiment, the locking part 33 is formed on the resin inner 3, and the locking part 33 is inserted into the recessed part 27 of the grommet 2. Due to this, relative rotational movement of the grommet 2 and the resin inner 3 is suppressed. Thus, with the grommet assembly 1 and the wire harness WH, rotational movement of the grommet 2 can be suppressed when the grommet 2 is pressed and stress is caused, for example, and the water cutoff function of the grommet 2 can be secured.

Furthermore, with the grommet assembly 1 and the wire harness WH according to the present embodiment, the resin inner 3 includes the locking pawl 33b extending in the axial direction, and the protector 4 includes the hole part 45 into which the locking pawl 33b is inserted, the part to be locked 46 to which the locking pawl 33b inserted into the hole part 45 is locked, and the inclined surface 47 for guiding the locking pawl 33b to the hole part 45. Due to this, with the grommet assembly 1 and the wire harness WH, the locking pawl 33b can be guided to the hole part 45 by the inclined surface 47 at the time when the resin inner 3 is attached to the protector 4. Thus, the resin inner 3 can be easily assembled to the protector 4.

The embodiment of the present invention is exemplified above. However, the embodiment described above is merely an example, and does not intend to limit the scope of the invention. The embodiment described above can be implemented in various other forms, and can be variously omitted, replaced, combined, and modified without departing from the gist of the invention. Additionally, specs such as each configuration and a shape (a structure, a type, a direction, a format, a size, a length, a width, a thickness, a height, the number, arrangement, a position, a material, and the like) can be appropriately changed.

For example, in the above embodiment, described is a case of attaching the grommet assembly 1 and the wire harness WH to the panel 10 as the floor panel of the vehicle, but the embodiment can also be applied to a case of attaching the grommet assembly 1 and the wire harness WH to a panel for a vehicle other than the floor panel or another panel.

The grommet assembly and the wire harness according to the present embodiment can be appropriately attached to an attachment target.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet assembly comprising:
a grommet through which a wiring material is inserted, that is attached to a through hole formed on a panel for a vehicle;
a resin inner arranged to abut on a side of the grommet opposite to the panel for the vehicle; and
a protector through which the wiring material is inserted, the protector being locked to the resin inner and attached to the panel for the vehicle to hold the grommet and the resin inner between the protector and the panel for the vehicle, wherein
the grommet includes a lip part that abuts on the panel for the vehicle, and includes a hollow part formed in a region on a resin inner side with respect to the lip part.

2. The grommet assembly according to claim 1, wherein the resin inner includes a main body part having a cylindrical shape, and a flange part extending outward in a radial direction from the main body part, and the flange part extends toward the radial direction to a position of the lip part, and presses the lip part toward the panel for the vehicle in a state in which the protector is attached to the panel for the vehicle.

3. The grommet assembly according to claim 2, wherein the resin inner includes a locking part projected outward in a radial direction from an outer peripheral surface of the main body part to be locked to the protector, and
a recessed part recessed outward in the radial direction into which the locking part is able to be inserted is formed on the grommet.

4. The grommet assembly according to claim 3, wherein the locking part includes a locking pawl extending in an axial direction of the resin inner, and
the protector includes a hole part into which the locking pawl is inserted, a part to be locked to which the locking pawl inserted into the hole part is locked, and an inclined surface for guiding the locking pawl to the hole part.

5. The grommet assembly according to claim 1, wherein the resin inner includes a main body part having a cylindrical shape, and a locking part projected outward in a radial direction from an outer peripheral surface of the main body part to be locked to the protector, and
a recessed part recessed outward in the radial direction into which the locking part is able to be inserted is formed on the grommet.

6. The grommet assembly according to claim 5, wherein the locking part includes a locking pawl extending in an axial direction of the resin inner, and
the protector includes a hole part into which the locking pawl is inserted, a part to be locked to which the locking pawl inserted into the hole part is locked, and an inclined surface for guiding the locking pawl to the hole part.

7. A wire harness comprising:
a wiring material having electrical conductivity; and
a grommet assembly disposed on the wiring material, wherein
the grommet assembly includes:
a grommet through which the wiring material is inserted, that is attached to a through hole formed on a panel for a vehicle;
a resin inner arranged to abut on a side of the grommet opposite to the panel for the vehicle; and
a protector through which the wiring material is inserted, the protector being locked to the resin inner and attached to the panel for the vehicle to hold the grommet and the resin inner between the protector and the panel for the vehicle, wherein
the grommet includes a lip part that abuts on the panel for the vehicle, and includes a hollow part formed in a region on a resin inner side with respect to the lip part.

8. A grommet assembly comprising:
a grommet through which a wiring material is inserted, that is attached to a through hole formed on a panel for a vehicle;
a resin inner arranged to abut on a side of the grommet opposite to the panel for the vehicle; and
a protector through which the wiring material is inserted, the protector being locked to the resin inner and attached to the panel for the vehicle to hold the grommet and the resin inner between the protector and the panel for the vehicle, wherein
the resin inner includes a main body part having a cylindrical shape, and a locking part projected outward in a radial direction from an outer peripheral surface of the main body part to be locked to the protector, and a recessed part recessed outward in the radial direction into which the locking part is able to be inserted is formed on the grommet.

9. A wire harness comprising:

a wiring material having electrical conductivity; and a grommet assembly disposed on the wiring material, wherein the grommet assembly includes:

a grommet through which the wiring material is inserted, that is attached to a through hole formed on a panel for a vehicle;

a resin inner arranged to abut on a side of the grommet opposite to the panel for the vehicle; and a protector through which the wiring material is inserted, the protector being locked to the resin inner and attached to the panel for the vehicle to hold the grommet and the resin inner between the protector and the panel for the vehicle, wherein the resin inner includes a main body part having a cylindrical shape, and a locking part projected outward in a radial direction from an outer peripheral surface of the main body part to be locked to the protector, and a recessed part recessed outward in the radial direction into which the locking part is able to be inserted is formed on the grommet.

\* \* \* \* \*